July 24, 1962

R. N. DAWSON 3,046,478

TESTING OF DIELECTRIC MATERIALS

Filed Nov. 24, 1959

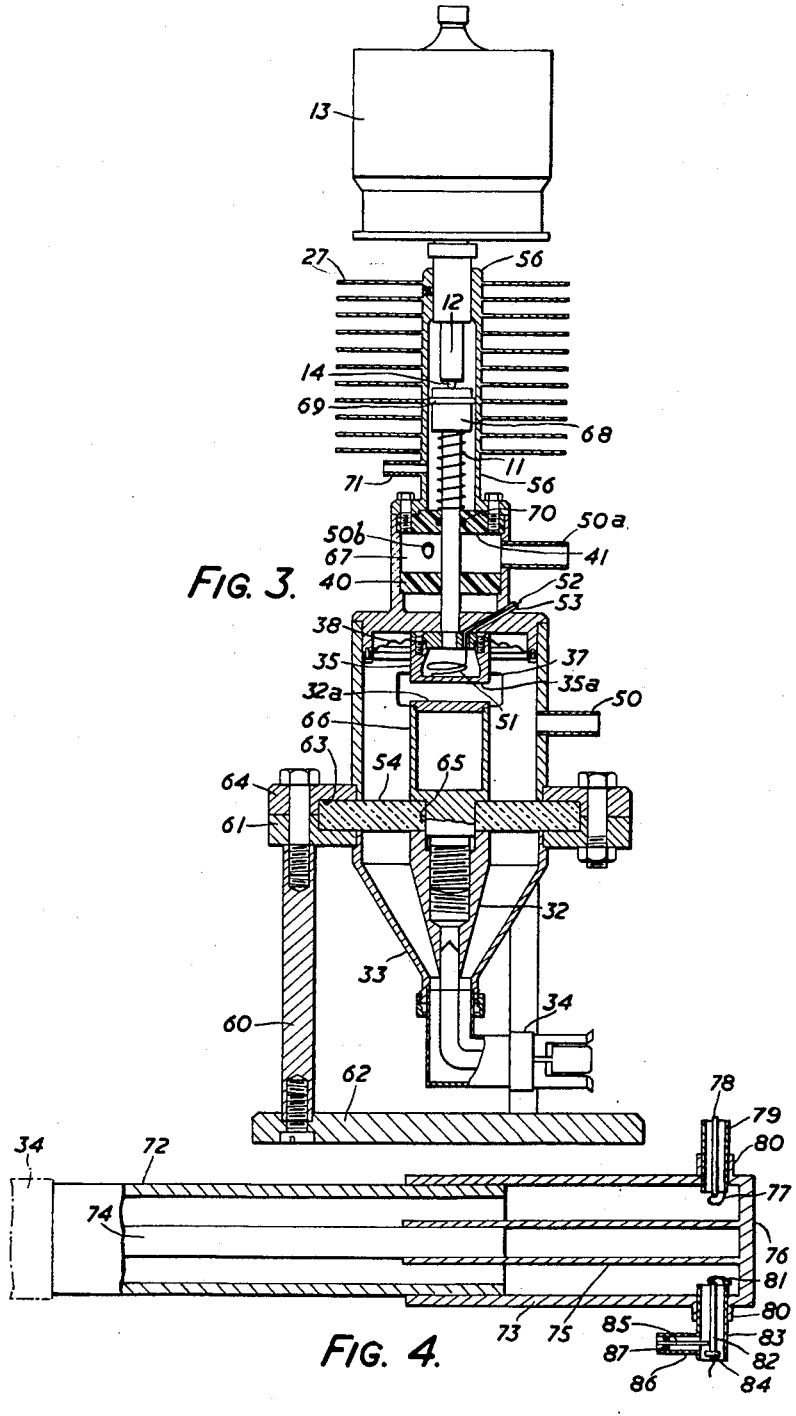

United States Patent Office 3,046,478
Patented July 24, 1962

3,046,478
TESTING OF DIELECTRIC MATERIALS
Roger Neil Dawson, Ilford, England, assignor to The Plessey Company Limited, London, England, a company of England
Filed Nov. 24, 1959, Ser. No. 855,239
26 Claims. (Cl. 324—58)

This invention relates to the testing of dielectric materials at ultra-high frequencies and has for an object to provide improved apparatus for this purpose which can be so constructed that one and the same apparatus of moderate dimensions is suitable for use over a wide range of frequencies.

According to the present invention a test disc of the material to be examined is used as the dielectric of a capacitor formed between a fixed electrode face formed by the larger end surface of the inner conductor of a conical or part-conical coaxial-line element of constant impedance, which is connected coaxially to a telescopically adjustable air-line, and a second electrode face, parallel to this end surface, which is provided on an electrode movable in the axial direction of the line element under the action of an axially acting micrometer device, the movable electrode being electrically connected to the outer conductor of the conical or part-conical coaxial line element by a flexible metal diaphragm, thereby avoiding the need for the provision of any sliding contacts, the apparatus being equipped with suitable input and output coupling elements. The coupling means may comprise a capacity-probe input at the wider end of the conical line portion and an output loop extending into the air line near its short circuited end.

In order to permit the measurement of dielectric qualities at controlled temperatures, an inlet is preferably provided through which hot (or cold) air may be blown into the space between the inner and outer conductor in the vicinity of the electrode-forming surfaces, the diaphragm being imperforate or nearly imperforate to prevent access of hot air to the sensitive micrometer portion, although radial slots may be provided to reduce inductance, and an exhaust slot being provided which preferably is so arranged as to serve also as opening for the insertion and removal of the discs of dielectric material to be tested.

A thermo-couple or temperature-responsive resistor is preferably incorporated in the movable electrode, near to its electrode face, for permitting a check on the temperature at which the material is being tested.

Two embodiments of the invention are illustrated in the drawings by way of example. In the drawings accompanying the specification—

FIGURE 3 shows similarly to FIGURE 1, the corresponding parts of a modified embodiment, and FIGURE 4 is a sectional elevation of an adjustable air-line for use therewith.

Figure 1:
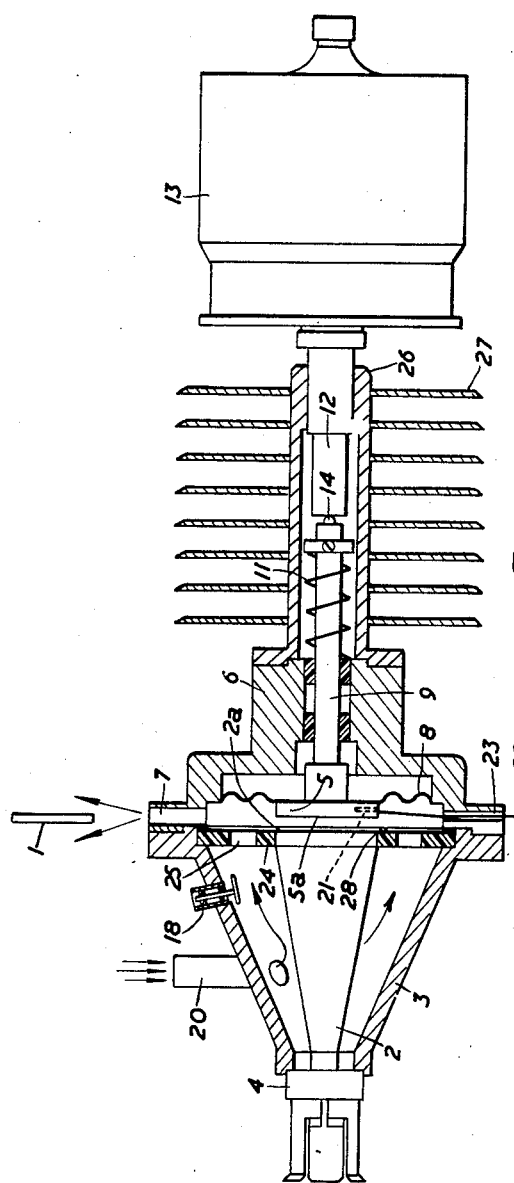
FIGURE 1 is an elevation, partly in axial section of a cone-head according to one embodiment including the conical line element together with the connector for the adjustable air-line and the means for micrometer adjustment of the movable electrode.

Referring now first to FIGURE 1, the essential part of the apparatus according to the invention is constituted by a test chamber in the form of a cone head constituting a conical coaxial line element having an inner conductor 2 and an outer conductor 3, both the outer diameter of the inner conductor and the inner diameter of the outer conductor increasing conically from a narrower end terminating in a coaxial connector 4 to a wider end, at which the inner conductor 2 presents an electrode face 2a the diameter of which corresponds to that of the sample disc 1 for which the apparatus is intended. The cone angles of the centre electrode 2 and of the outer electrode 3 of the cone head are so determined in relation to each other that both cones have a common apex, thereby keeping the diameter ratios constant. A second condenser electrode 5 has a face 5a facing the electrode face 2a and is guided for movement axially of the coaxial line in a cover member 6 attached to the open end of the outer conductor 3, a slot 7 being left at the upper side of the cover member 6 for the insertion of test discs 1 between the electrode faces 2a and 5a. The movable electrode 5 is electrically connected to the outer conductor 3 of the cone head at the outer end of the cone by an early imperforate, radially slotted flexible metal diaphragm 8 which is connected conductively and in an airtight manner both to the electrode 5 and to the member 6 so as to avoid any sliding contact of the movable electrode, electrical connection between the diaphragm 8 and the conical outer conductor 3 being effected through the body of the cover member 6. The electrode 5 has a stem 9, which is supported and guided in the cover member 6 by bushes 10 made of self-lubricating, heat resistant plastic, such as polytetrafluorethylene (P.T.F.E.), for example the material known under the registered trademark Teflon, a spring 11 being provided which tends to move the electrode 5 away from the electrode 2 and holds it, with the interposition of a bearing ball 14, in contact with the stem 12 of a micrometer head 13 supported on a tubular extension 26 of the cover 6. By operation of the micrometer the movable electrode 5 may be applied to the test disc 1 to ensure close contact between the latter and both electrodes, whereupon the thickness of the dielectric material can be read on the micrometer head 13. To complete an adjustable-frequency resonant testing circuit, an adjustable air-line, constituted by telescopic coaxial line sections 15 and 16 and short-circuited at one end by an end plate 17, is coupled at its other end to the cone head by the coaxial connector 4. Ultra-high frequency oscillations are applied to the system through an electrostatic input probe 18 near the base of the cone head 2, 3, while an output loop 19 projects into the air line near the closed end thereof for connection to a suitable indicating instrument.

In order to allow dielectric material to be tested at increased or otherwise controlled temperatures, the cone head is provided with an inlet 20 for hot or cold air. Such air may be introduced into the cavity between the conical conductors 2 and 3 through the inlet 20 and allowed to leave this cavity through the sample-insertion slot 7, the nearly imperforate diaphragm 8 preventing access of hot air to the sliding support of the movable electrode 5 and to the micrometer 12, 13. A thermocouple or other electrical temperature-measuring element 21 is accommodated in the movable electrode 5 close to the electrode face 5a, the insulated leads 22 from this measuring element being conducted through a suitable aperture 23 in the cover member 6 to permit a check on the temperature at which the dielectric is being examined. The conical centre electrode 2 is supported near its electrode face 2a by a locating disc 24 of polystyrene or other suitable insulating material. This disc is provided with apertures 25 through which the hot (or cold) air may be passed freely from the inlet 20 to the outlet 7, and the locating disc is further equipped with stop pins 28 which serve to support and locate the sample discs 1 between the electrode faces 2a and 5a. Although the diaphragm 8 substantially prevents hot air from access to the greater part of the cover 6 and to the stem 9, it has nevertheless been found desirable to equip the tubular extension 26, by which the micrometer head 13 is supported on the cover 6, with cooling fins as indicated at 27.

In order to test a sample, resonance is first established at a given frequency, by varying the length of the air line, and the output level is read from the output loop. The sample is then removed and resonance restored by adjusting the micrometer head, and the Q factor of the cavity is determined with the air as the capacitor dielectric in place of the sample. The power factor and the dielectric constant of the sample are then determined from the output-level readings, the Q factor, and the micrometer readings. If tests are carried out at increased temperature, air cooling is preferably applied to the outer side of the connector 4 to keep the connector reasonably cool and its dimensions constant.

It has been found that with apparatus according to the invention in its present form having an electrode face diameter of 1 inch, dielectric tests can be carried out successfully within a frequency range from 100 to 1,000 megacycles per second at any temperature between room temperature and 100° C.

The frequency range may be further extended by the use of inter-changeable air lines, which may be of a modified construction, when higher frequencies are required. The temperature range may be extended by using alternative insulating materials for the supports.

The cone angles of the centre electrode 2 and the outer electrode 3 of the cone head are so determined in relation to each other that both cones have a common apex, thereby keeping the diameter ratios constant.

One of the advantages of the apparatus according to the invention is that due to the absence of a separate micrometer condenser the temperature coefficient of the apparatus is zero, with the described method of operation, provided that a zero micrometer reading is taken at the working temperature.

Figure 2:
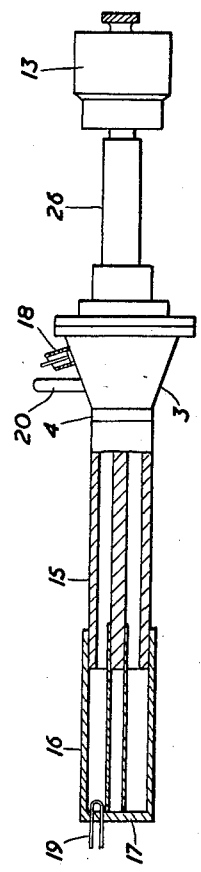
FIGURE 2 is an elevation, partly in section, showing schematically the complete resonant assembly.

FIGURES 3 and 4 illustrate an embodiment of the invention which is suitable for operation at even higher temperatures than that of FIGURES 1 and 2, and in which the micrometer axis is arranged vertically for more convenient insertion and removal of the sample discs. The same references have been used for substantially identical parts, while modified parts have received references which are increased by 30 over those used in FIGURES 1 and 2. Referring now more in detail to FIGURES 3 and 4, the dielectric disc 24 by which in the embodiment of FIGURES 1 and 2 the inner element 2 of the conical coaxial line in the embodiment above described is centred in the outer element 3, has been replaced by a rigid imperforate disc 54, preferably made of fired quartz, which combines good dielectric qualities with resistance to high temperatures. This quartz disc 54 is supported on a flange 61 of the outer member 33 of the conical coaxial line 32, 33, which itself rests by means of columns 60 on a base plate 62, and it is accommodated with sealing contact in a peripheral groove 63 formed between the flange 61 and a similar flange 64 of the cover member 36. The rigid disc 54 supports and axially locates the inner member 32 of the coaxial cone section 32, 33, by also engaging a groove 65 in a cylindrical extension 66 at the wider end of the said cone section. This cylindrical extension 66 with the cylindrical outer wall of the cover member 36 forms a cylindrical continuation of the conical coaxial line portion. The provision of this cylindrical extension has the advantage of providing a more uniform field distribution at the location of the sample on the top surface 32a of the portion 66 than is available in the embodiment of FIGURES 1 and 2.

While the interposition of the quartz disc between elements 33 and 36 and between the surfaces of elements 32 and 66 tends to affect the electric continuity of the coaxial line, this can be mitigated at least within a reasonable frequency range, by so arranging the depth of the grooves in relation to the thickness of the quartz plate 54 that this capacitative variation is substantially compensated by the inductive effect of the conduction path round the groove, thus ensuring minimum line standing wave ratio.

The hot-air inlet tube 50 terminates in the cylindrical wall of cover portion 36, and arrangement which in conjunction with the imperforate dielectric disc 54 confines the hot air to the space between the disc 54 and the diaphragm 38. In view of the higher temperatures for which this embodiment is intended to be suitable, arrangements have further been made for introducing cooling air through an inlet 50a to the chamber 67 between the two plate-shaped bearing bushes 40 and 41 for the stem 9, one or more hot air outlets 50b being provided at suitable places of the wall 36.

Another modification, which is intended to facilitate the accurate determination of the Q factor, consists in that the stem 9 is provided with a piston head 68 having an O-ring seal 69, while a further O-ring seal 70 is provided in the bush 41, and an outlet connection 71 is provided in the wall sleeve extension 56 supporting the micrometer head. This permits the space between the piston member 68 and the bush 41 to be filled with liquid, and a capilliary tube to be connected to connection 71 to produce a liquid level which will rise and fall by a very much enlarged amount for any small rise or fall of the piston member 68. It has been found in practice that in this manner a magnification can be obtained which permits small variations to be read with greater accuracy than is possible by means of the micrometer head 13.

It has been found that the width of the band match which can be obtained with the device according to the invention depends to some extent upon the taper of the inner cone element 32, and that a taper angle of 15° (cone angle of 30°) will give a good wide-band match.

The entire inner surfaces, that is to say the inner side of the cone shell 33 and of the housing 36 and the outer side of the cone core 32, of the cylindrical core 66, and of the movable electrode 35 are preferably coated with a highly conductive metal. Gold is preferably employed in the case where air is used as the heating and/or cooling medium, while silver may be used when the temperatures are less high or where oxidation is prevented by other means, for example by a protective atmosphere. The apparatus is preferably used with slotted air line for the introduction of an input from a standard frequency source, preferably a source having a frequency equal to or similar to the standard working frequency of the sample discs to be tested. The air line is of telescopic construction so that it is adjustable within a range of frequencies, and it comprises two telescopically joined outer conductors 72 and 73 arranged coaxially respectively round a solid inner member 74 and a tubular inner member 75 which fits telescopically over the solid member 74. The air line is short circuited at the outer end by a short-circuit plate 76. Input is effected by an input loop 77 mounted at the end of a coaxial member 78, 79 which is adjustably slidable in a bush 80 of the outer conductor 73, and the output is obtained by a similar loop 81 arranged in diametrical opposition to the loop 77, carried on a concentric unit 82, 83 which is likewise slidable in a bush 80. A rectifier 84 of the semi-conductor diode type, for example a silicon diode, is arranged at the end of the line 82, 83 to convert the output into D.C., and in order to ensure that the rectifier output is not unduly reduced by vicinity to a node, so called stub-tuning is provided by means of a tunable concentric stub line 85, 86 of which the short-circuit member 87 is slidable so that it can be set at approximately a quarter wavelength from the junction of the stub line with the line 82, 83, this junction being arranged in close proximity to the rectifier 84. In this manner the cavity Q-factor can be increased, thus allowing smaller loss tangents to be accurately measured.

Penetration of the loops 77 and 81 is so arranged as to produce adequate sensitivity with a minimum of interference with the Q-factor of the cavity.

What I claim is:

1. In apparatus for the testing of dielectric materials at very high to ultra-high frequencies, wherein a capacitor adapted to incorporate a test disc of the material to be examined, is formed between a fixed electrode face and an opposed parallel electrode face movable at right angles to the said fixed face under the control of an axially acting micrometer device; the combination of a coaxial line element having an inner conductor conical on at least part of its length and an outer conductor conical on at least part of its length arranged coaxially with said inner conductor, the cone surface of said two conductors having a common apex, the larger end surface of said inner conductor constituting a fixed electrode face, and short-circuiting means attachable to the narrower ends of said inner and outer conductors.

2. In apparatus for the testing of dielectric materials at very high to ultra-high frequencies, wherein a capacitor adapted to incorporate a test disc of the material to be examined, is formed between a fixed electrode face and an opposed parallel electrode face movable at right angles to the said fixed face under the control of an axially acting micrometering device, the combination of a coaxial line element having an inner conductor conical on at least part of its length and an outer conductor conical on at least part of its length and arranged coaxially with the inner conductor, the cone surfaces of said two conductors having a common apex, the larger end surface of said inner conductor constituting the fixed electrode face, and a telescopically adjustable air line, short-circuited at one end, attached at its other end to the narrower ends of said inner and outer conductors to form a continuation of said coaxial line element.

3. Apparatus for the testing of dielectric materials at very high to ultra-high frequencies, comprising an inner conductor being conical for at least part of its length, an outer conductor having at least a conical portion coaxially encircling, and longitudinally coextensive with, said conical length of the inner conductor, with the apices of the cone surfaces of the two conductors coinciding, a member of insulating material mechanically interconnecting said two conductors in the vicinity of the wider ends of said conical lengths thereof, the larger-diameter ends of said inner electrode constituting a fixed electrode having an electrode face perpendicular to the common axis of said cone surfaces, short-circuiting means attachable to the smaller-diameter ends of said inner and outer conductors, a second electrode including an end portion of the same diameter as the electrode face of said fixed electrode and terminated by an electrode face perpendicular to the axis of said second electrode, means for supporting said second electrode for movement coaxially with said fixed electrode in mutual face-to-face relation, means co-operating with said fixed and second electrodes and operative to accurately indicate the mutual distance between the electrode faces of said electrodes, a flexible metal diaphragm interconnecting a zone of the outer conductor in the vicinity of the plane including the face of the fixed electrode, with a zone of the second electrode in the vicinity of the plane containing the electrode face thereof, input coupling means for producing electrical oscillations in said coaxial line element, and output coupling means for sensing such oscillations.

4. Apparatus as claimed in claim 3, wherein the outer conductor is formed with a coaxial extension beyond the larger-diameter of said part conical portion.

5. Apparatus as claimed in claim 3, wherein the diaphragm is provided with narrow radial slots to reduce inductance.

6. Apparatus as claimed in claim 3, wherein the distance-indicating means include a micrometer device arranged coaxially with the electrodes so as to be separated from the electrode faces by the second electrode and the diaphragm.

7. Apparatus as claimed in claim 6, wherein the outer conductor has an inlet through which gases of a desired temperature may be blown into the outer conductor to control the temperature of the electrode-face-forming end portions of the fixed and second electrodes, said outer conductor further having an exhaust slot at such a position as to permit the insertion between said electrode face and removal of sample discs through said slot, the diaphragm being at least nearly imperforate to counteract access of such gases to the micrometer device.

8. Apparatus as claimed in claim 7, wherein an electrical temperature-metering element is incorporated in the second electrode, near to its electrode face.

9. Apparatus as claimed in claim 7, including a stem arranged coaxially with the second electrode and carrying the second electrode at one of its ends and co-operating at its other end with the micrometer device, a circumferential wall mechanically connected to one end of the coaxial line element and surrounding at least part of the length of said stem, and a pair of partitions extending across said peripheral wall to form jointly therewith a chamber through which said stem passes substantially axially, each said partition containing a bushing in which said stem is slidable with a substantially air-tight fit.

10. Apparatus as claimed in claim 9, wherein said peripheral wall has an air inlet for cooling purposes and at least one air exhaust aperture.

11. Apparatus as claimed in claim 3, including a stem carrying the second electrode, a cylinder member having a fluid-tight seal through which said stem enters the cylinder member, a piston on said stem sealingly slidable in said cylinder member, and a capillary tube communicating at one end with the interior of the said cylinder for indicating small displacements of the second electrode.

12. Apparatus as claimed in claim 3, wherein the short-circuiting means include a telescopically adjustable air line short-circuited at one end, and attachable to the narrower ends of said inner and outer conductors to form a continuation of said coaxial line element.

13. Apparatus as claimed in claim 12, wherein the coupling means include an output loop extending into the adjustable air line near its short circuited end.

14. Apparatus as claimed in claim 13, including a coaxial tap line extending into the adjustable air line near the short-circuited end of said air line, said tap line carrying the output loop and terminating in a semiconductor diode for converting the output into D.C.

15. Apparatus as claimed in claim 13, wherein the output loop is arranged in a coaxial tap line terminating in a semiconductor diode for converting the output into D.C.

16. Apparatus as claimed in claim 15, wherein the tap line is provided with stub-tuning means adjacent to the diode.

17. Apparatus as claimed in claim 3, wherein the coupling means include a capacity probe input adjacent the wider end of the conical line portion.

18. Apparatus as claimed in claim 13, wherein the output loop projects radially into the air line and the input coupling means comprise a similar loop arranged in diametric opposition to the output loop.

19. Apparatus as claimed in claim 18, wherein the input and output loops are each slidably adjustable radially of the air line to vary the degree of coupling.

20. Apparatus as claimed in claim 3, wherein the inner conductor of the conical or part-conical line element has a taper of 15 degrees corresponding to an apex angle of 30 degrees.

21. Apparatus as claimed in claim 3, wherein the inner conductor is located, adjacent to the wider end of its conical portion, by a disc of insulating material held in an annular groove of the outer conductor.

22. Apparatus as claimed in claim 3, wherein the coaxial line element includes a conical portion continued at its wider end by a cylindrical portion, the fixed electrode face being formed at the end of the inner element of said cylindrical portion.

23. Apparatus as claimed in claim 22, wherein the insulating member interconnecting the two conductors is a rigid disc of insulating material lodged in peripheral recesses of the inner and outer conductors of the coaxial line element in the cylindrical large-diameter portion thereof.

24. Apparatus as claimed in claim 23, wherein the insulating disc is imperforate and consists of quartz.

25. Apparatus as claimed in claim 23, wherein the cylindrical portion of the outer conductor of the coaxial line element has a gas inlet through which gases of a desired temperature may be blown into the outer conductor to control the temperature of the electrode-face-forming end portions of the fixed and second electrodes, said outer conductor further having an exhaust slot at such a position as to permit the insertion between the electrode faces and the removal of sample discs through said slot, the diaphragm being at least nearly imperforate to counteract access of such gases to the micrometer device.

26. Apparatus as claimed in claim 3, wherein the part-conical line element terminates at its smaller-diameter end in a rectangular air line junction for the attachment of the telescopic air line.

References Cited in the file of this patent

UNITED STATES PATENTS

| | | |
|---|---|---|
| 2,217,626 | Strang et al. | Oct. 8, 1940 |
| 2,358,462 | Mahrenq | Sept. 19, 1944 |
| 2,505,936 | Behn | May 2, 1950 |

OTHER REFERENCES

Works: "Resonant Cavities for Dielectric Measurements," Journal of Applied Physics, vol. 18, July 1947, pages 605–612.

Reynolds: "Improved Re-entrant Cavity," General Electric Review, September 1947, pages 34–39.